W. L. FINNE.
COIL BOX FOR CONDENSERS.
APPLICATION FILED APR. 18, 1917.

1,251,493.

Patented Jan. 1, 1918.
2 SHEETS—SHEET 1.

Inventor
William L. Finne
By Frederick V. Winters,
Attorney

W. L. FINNE.
COIL BOX FOR CONDENSERS.
APPLICATION FILED APR. 18, 1917.
1,251,493.
Patented Jan. 1, 1918.
2 SHEETS—SHEET 2.
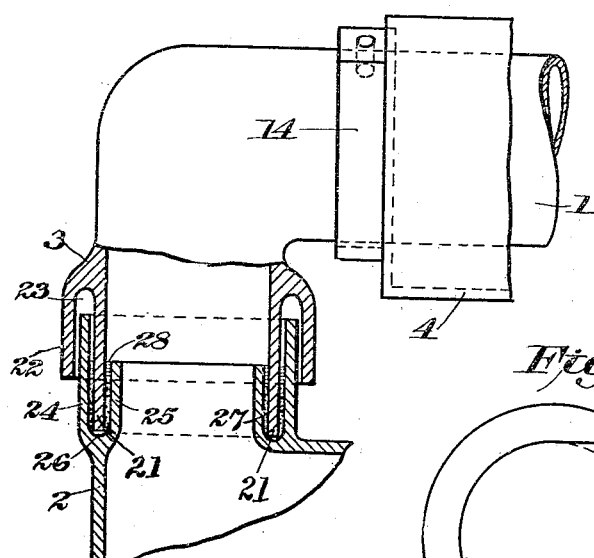
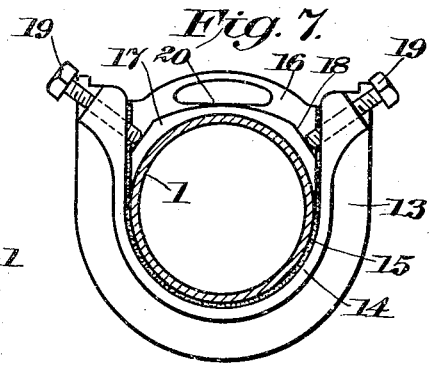
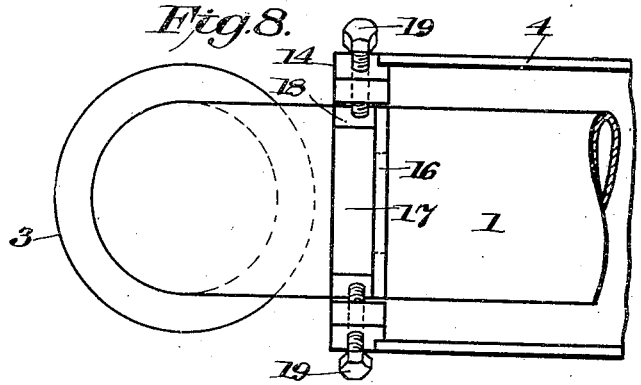
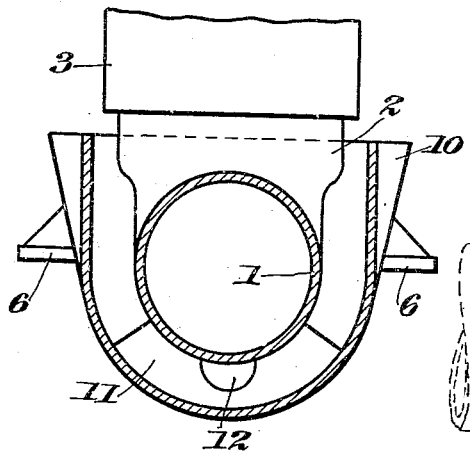
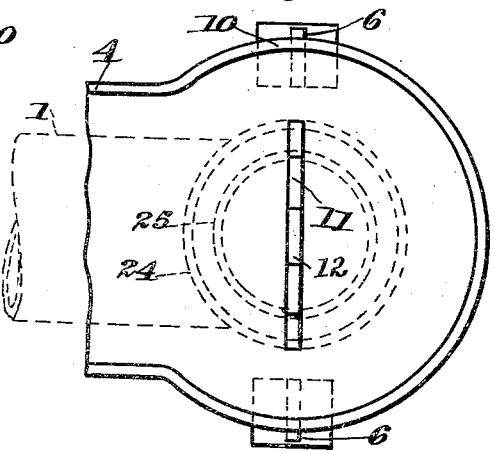
Inventor
William L. Finne
By Frederick V. Winters
Attorney

UNITED STATES PATENT OFFICE.

WILLIAM L. FINNE, OF ELIZABETH, NEW JERSEY.

COIL-BOX FOR CONDENSERS.

1,251,493.   Specification of Letters Patent.   Patented Jan. 1, 1918.

Application filed April 18, 1917. Serial No. 163,028.

*To all whom it may concern:*

Be it known that I, WILLIAM L. FINNE, a citizen of the United States, residing at Elizabeth, in the county of Union and State of New Jersey, have invented certain new and useful Improvements in Coil-Boxes for Condensers, of which the following is a full, clear, and exact specification.

This invention relates to condenser coils, and has for its object to provide improved boxes or troughs to fit around the horizontal pipes of said coils whereby the same may be maintained immersed in cooling liquid.

A special object of the invention is to provide improved and simplified means for supporting the boxes or troughs on the pipes. Said boxes or troughs are designed especially for use on condenser coils having bolt free but liquid sealed joints as disclosed in my prior application filed March 27, 1917, Serial No. 157,606, and a further object of the present invention is the provision of means for supporting the pipes of the coil by means of the boxes or troughs. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:

Fig. 6 is an enlarged side view of the collar-carrying end of one of the troughs, and also shows the bolt free but liquid sealed joint between the pipes of the coil.

Fig. 7 is an end view of the trough looking at its collar-carrying end, the pipe being shown in section, and the packing and bridge in place.

Fig. 8 is a plan view of the collar-carrying end of the trough with the pipe in place therein.

Fig. 9 is a transverse section through the trough and pipe near the other end of said trough, showing the flared cup formation of that end of the trough and the brackets for supporting it and the pipe, and Fig. 10 is a plan view of the same end of the trough, the pipe being indicated in dotted lines.

Figure 1:
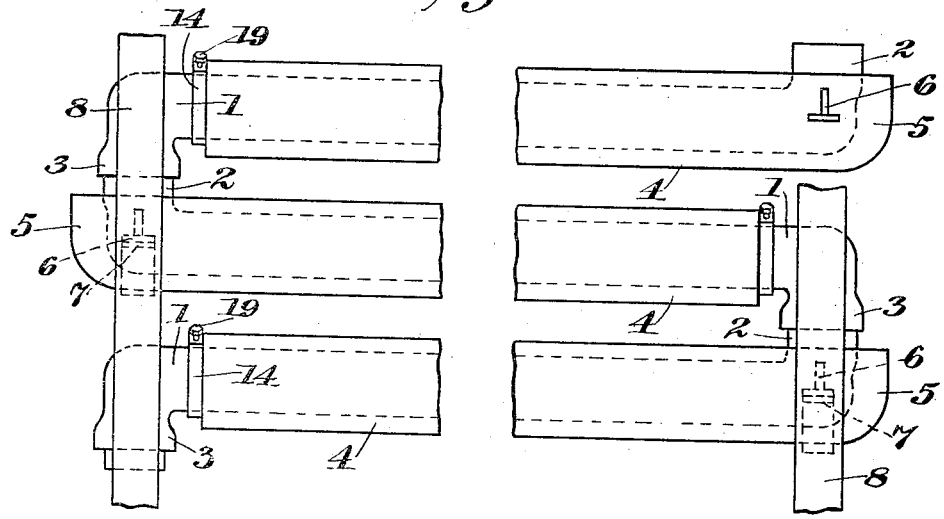
Figure 1 is a broken side elevation of part of a condenser coil fitted with boxes or troughs substantially in accordance with this invention.
Figure 2:
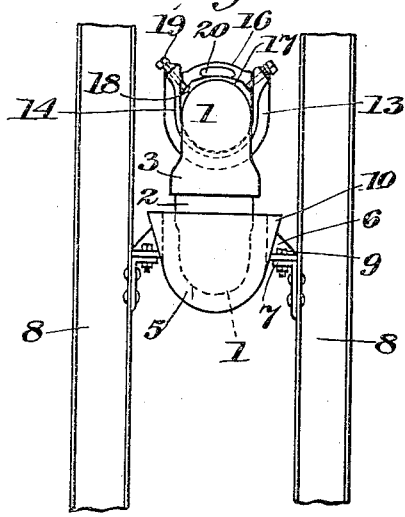
Fig. 2 is an end view of part of the coil.
Figure 3:
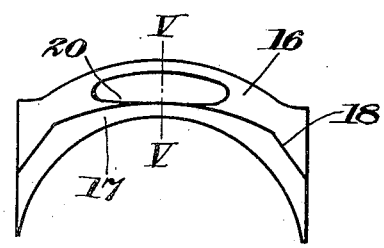
Fig. 3 is a detailed side view of the bridge which is used to fit over the pipe at the collar-carrying end of the trough.
Figure 4:
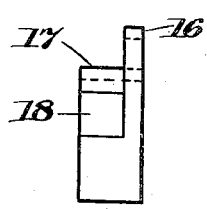
Fig. 4 is an end view of the bridge.
Figure 5:
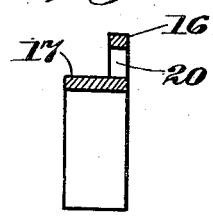
Fig. 5 is a sectional view thereof on the line V—V of Fig. 3.

A condenser coil consisting of pipe sections 1 having jointed ends 2 and 3, as illustrated in Fig. 1, may be most effectively used with the greatest economy in cooling fluid by providing each horizontal stretch of pipe with a box or trough for holding the cooling liquid so as to maintain said pipe always immersed therein. In accordance with the present invention, each box or trough 4 is formed with an upturned cup-shaped end 5 adapted to fit around the upwardly turned end 2 of each pipe 1 of the coil. At opposite sides of the end portion 5 of each trough there are formed brackets 6 designed to rest upon brackets 7 on supporting uprights 8. As illustrated in Fig. 2, the brackets 6 and 7 may be fastened together by bolts 9. The brackets serve to support one end of each trough. The corresponding end of each pipe of the coil is supported in the trough upon a web 11 having an opening 12 therein to permit free circulation of the cooling liquid below the pipe.

It will be understood that the opposite end of each pipe of the coil is supported by having its downwardly turned end 3 rest upon the upwardly turned end 2 of the next pipe below it, which lower pipe is supported at that end by the trough below it which is in turn supported by the lugs 6 and 7 as already described. The end of each trough adjacent the downwardly turned end 3 of its pipe is supported thereon by means of screws or bolts 19 arranged obliquely in the upper ends of the flange 14 on a collar 13 at that end of the trough. The collar 13 brings the flange 14 in closely around the pipe 1, as best shown in Figs. 6 and 7. Packing 15 is placed between the pipe and the flange 14, and a bridge 16 is placed over the pipe at this point to maintain the cooling liquid at a level above the top of the pipe. Said bridge 16, as shown in Figs. 3, 4, 5 and 7, fits snugly around the upper portion of the pipe, while the packing 15 extends up between the ends of said bridge and the flange 14, as shown in Fig. 7. It is not necessary that the packing entirely prevent leakage of the cooling liquid around the pipe. It is sufficient for said packing to prevent such leakage to an extent so that it will not exceed the flow of said cooling liquid into each trough from the next one above, so that the level of the liquid is always maintained in the trough above the pipe. The bridge 16 is provided with a flange 17 having inclined end surfaces 18 engaged by the bolts 19. It will be seen that the bolts thus serve to hold the bridge closely down upon the pipe, and to also support the collar carrying end of the trough on said pipe with the packing 15 compressed between the flange 14 and the under surface of the pipe. The bridge 16 is further provided with an opening 20, the lower edge of which is arranged slightly below the level of the sides of the trough, for the purpose of directing the flow of the cooling liquid out over the downwardly turned end 3 of the pipe and the upwardly turned end 2 of the next pipe below. The liquid falling over the ends of the pipes in this way is caught in the upwardly turned cup shaped end 5 of the next trough, as clearly indicated in Figs. 1 and 2. The ends 5 of the troughs are preferably flared, as at 10, to insure all of said falling liquid being caught therein.

As illustrated in Fig. 6, the downwardly turned end 3 of each pipe is preferably formed with two concentric flanges, a long inner flange 21, and an outer and shorter flange 22 separated by a space 23. The upwardly turned end 2 of each pipe is also preferably formed with two concentric flanges 24 and 25. The flange 24 extends above the flange 25 and is arranged in the space 23 between the flanges 21 and 22 on the upper pipe. The flange 21 on the upper pipe is arranged in a groove 26 between the flanges 24 and 25 on the lower pipe, and packing 27 is placed around said flange 21 in said groove 26. During the process of condensation within the pipe, liquid will fill the space above the packing 27 in the groove 26, and form a liquid seal 28 around the flange 21. The flange 22 which overhangs the flange 24 forms a water shed which prevents the cooling liquid which flows down over the joint from entering the same, especially as the flange 24 extends well above the flange 25. This bolt free but liquid sealed joint for condenser pipes is covered in my former application referred to above, but is here described in order to make it clear how the troughs for the cooling liquid coöperate with said pipes.

Having thus described my invention, what I claim as new and desire to secure by Letters Patent of the United States is:

1. The combination with a horizontal pipe section of a condenser coil having a turned up end, of a trough having a turned up end to fit around the corresponding end of the pipe section, means in the trough for supporting said pipe section in spaced relation therewith, means for supporting that end of the trough around the pipe section, a collar on the other end of the trough, said collar fitting around the under portion of the pipe section, and means carried by said collar for supporting that end of the trough on the pipe section.

2. The combination with a horizontal pipe section of a condenser coil having a turned up end, of a trough having a turned up end surrounding the corresponding end of the pipe section, means for supporting that end of the trough, a web in that end of the trough for supporting the corresponding end of the pipe section therein, and means for supporting the other end of the trough on the pipe section.

3. The combination with a horizontal pipe section of a condenser coil having a turned up end, of a trough having a turned up end surrounding the corresponding end of the pipe section, means for supporting that end of the trough, a web in that end of the trough for supporting a corresponding end of the pipe section therein, said web having an opening therein to permit free circulation of the cooling liquid in the trough below the pipe section, and means for supporting the other end of the trough on the pipe section.

4. The combination with a condenser coil comprising horizontal pipe sections having bolt free joints at their ends, of troughs arranged below said pipe sections and having lugs at one end, uprights having lugs on which the lugs carried by the troughs rest for supporting one end of each trough and pipe, the other end of each pipe resting upon the supported end of the next pipe below it, and means for supporting the other end of each trough on its pipe.

5. The combination with a horizontal pipe section of a condenser coil, of a trough fitted around said pipe, means for supporting one end of the trough around the pipe section, a collar on the other end of the trough fitting around the under portion of the pipe section and extending above the pipe section at the sides thereof, and inclined bolts carried by the upper ends of said collar for supporting that end of the trough on said pipe section.

6. The combination with a horizontal pipe section of a condenser coil, of a trough arranged around said pipe, means for supporting one end of the pipe in proper position around the pipe section, a collar on the other end of the trough fitting around the under surface of the pipe section and extending above said pipe section at the sides thereof, a bridge fitting over the upper surface of the pipe section and having means to permit the escape of a cooling liquid from the trough at a level above the pipe section, and inclined bolts carried by the upper ends of the collar and engaging the bridge for holding the latter closely down around the upper surface of the pipe section, and supporting the collar-carrying end of the trough on said pipe section.

7. The combination with a horizontal pipe section of a condenser coil, of a trough arranged around said pipe, means for supporting one end of the pipe in proper position around the pipe section, a collar on the other end of the trough fitting around the under surface of the pipe section and extending above said pipe section at the sides thereof, a bridge fitting over the upper surface of the pipe section and having means to permit the escape of a cooling liquid from the trough at a level above the pipe section, and inclined bolts carried by the upper ends of the collar and engaging the bridge for holding the latter closely down around the upper surface of the pipe section, and supporting the collar-carrying end of the trough on said pipe section, there being packing between the under surface of the pipe section, the ends of the bridge and the collar, for the purpose specified.

8. The combination with a condenser coil consisting of horizontal pipe sections jointed at their ends, of troughs arranged around said pipe section, collars on one end of each trough fitting around the under surface of each pipe section, a bridge fitting over the upper surface of each pipe section and having means to permit the escape of a cooling liquid from the trough at a level above the pipe section therein, and a flared turned up end on each trough arranged below the collar carrying end of the next trough above for catching the cooling liquid after it has flowed over the joint between the pipe sections.

In testimony whereof I have signed my name to this specification.

WILLIAM L. FINNE.

Copies of this patent may be obtained for five cents each, by addressing the "Commissioner of Patents, Washington, D. C."